United States Patent [19]

Schneider et al.

[11] Patent Number: 4,824,514

[45] Date of Patent: Apr. 25, 1989

[54] DEVICE FOR PRINTING LABELS ON LABELING MACHINES

[75] Inventors: Egon Schneider, Neutraubling; Georg Ketterl, Straubing, both of Fed. Rep. of Germany

[73] Assignee: Krones AG Hermann Kronseder, Neutraubling, Fed. Rep. of Germany

[21] Appl. No.: 110,971

[22] Filed: Oct. 20, 1987

[30] Foreign Application Priority Data

May 13, 1987 [DE] Fed. Rep. of Germany ... 8706876[U]
Oct. 22, 1987 [DE] Fed. Rep. of Germany ....... 3635923

[51] Int. Cl.⁴ ............................................ B32B 31/00

[52] U.S. Cl. .................................. 156/387; 101/329; 101/332; 101/336; 101/348; 101/DIG. 33; 118/46; 156/384; 156/571

[58] Field of Search ....................... 156/387, 571, 384; 118/46; 101/329, 332, 336, 348, DIG. 7

[56] References Cited

U.S. PATENT DOCUMENTS 3,774,538 11/1973 Bullock .............................. 101/336

FOREIGN PATENT DOCUMENTS 3335261 4/1985 Fed. Rep. of Germany ...... 156/387

*Primary Examiner*—John J. Gallagher
*Attorney, Agent, or Firm*—Fuller, Puerner & Hohenfeldt

[57] ABSTRACT

The invention relates to apparatus for printing labels on labeling machines. To carry out the printing procedure, a longitudinally translating ink coated ribbon runs through ink in a container and is advanced by a rotating inking roller. The inking ribbon contacts the outer circumference of the inking roller. In order to achieve interruption-free and low maintenance but uniformly good application of ink onto the stamping or printing head, the invention provides that the inking ribbon, at the point of contact between the ink ribbon and the ink roller, has its longitudinal extension arranged substantially transversely of the rotational direction of the inking roller.

18 Claims, 5 Drawing Sheets

DEVICE FOR PRINTING LABELS ON LABELING MACHINES

BACKGROUND OF THE INVENTION

The following invention relates to an apparatus for printing labels on labeling machines with a stamping head, a rotating ink roller and a rotating inking ribbon which advances ink from an ink container to an inking roller, said inking ribbon coming into contact with the outer circumference of the inking roller.

Printing devices of this type are usually employed with labeling machines which are used with beverage filling installations. These printing devices serve, for example, to imprint filling dates or expiration dates onto the container label. This printing process can take place at the label holder, the glue palette, the gripping cylinder or directly onto the already-labeled container.

The arrangement of the printing devices on the container-filling equipment is very inconvenient with regard to maintenance procedures, since the devices can be reached only with extreme difficulty. Additionally, there is also no time for the maintenance personnel to perform any inspection work on the printing installation, since these personnel are already completely occupied with the re-supply of glue and labels. There is a demand that the printing installation not only require low maintenance, but that it also fulfill stringent requirements for quality printing.

A printing installation of the type mentioned above is known from DE-OS No. 35 30 352. With this printing installation, the inking ribbon is in the form of an endless inking ribbon which is guided over deflection rollers and which dips into an ink container located underneath the inking roller. As a result of the rotation motion of the inking ribbon, ink is carried upward and transferred to the inking roller. The inking roller is provided with a rubber coating to achieve the most uniform inking possible. Nevertheless, it sometimes happens that streaks appear on the inking roller, or areas of variable ink thickness occur, dttracting from the results of the printing. The stamping head possesses steel type which, over the course of time, indents the rubber layer on the inking roller.

SUMMARY OF THE INVENTION

It is the objective of the invention disclosed herein to improve on the device described above with respect to maintenance and the transfer of ink onto the stamping head, even while operating under conditions which are not favorable.

This task is solved according to the invention in that the longitudinal extension of the inking ribbon, within the area of contact between the inking ribbon and the inking roller, is arranged essentially transverse to the direction of rotation of the inking roller.

This has the advantage that, based on the fact that at this stage the directions of movement between the inking ribbon and the inking roller are no longer parallel, the ink will also be distributed across the rotational direction of the inking roller. It also happens that, as a result of this, uniform inking without cleaning and maintenance is possible over longer periods of time.

According to a preferred embodiment, the inking ribbon is arranged at approximately a right angle to the direction of rotation of the inking roller. It is thereby provided that the inking ribbon insures a distribution of ink on the outer side of the inking roller transverse to its rotational direction. It is advantageous for the inking roller to be constructed so as to have edges which are rounded-off. In this manner, on the one hand the stability of the inking ribbon is improved, and on the other hand a slight bead of ink forms between the inking ribbon and the rounded edges of the inking roller, said bead aiding the uniform distribution of ink on the surface of the inking roller.

It is particularly preferential for the inking roller to be constructed as a steel roller.

Thus, on the one hand the coefficient of friction between the inking ribbon and the inking roller is reduced, which increases the longevity of the inking ribbon, and on the other hand the type on the stamping head no longer leaves indentations behind in the inking roller, so that ink on the outer side of the inking roller is distributed uniformly even after the printing device has undergone extended operation.

The inking roller is particularly well protected if the stamping head is constructed with a type-wheel featuring rubber type. Rubber type is particularly well known for absorbing ink from the steel roller without the surface of the steel roller being harmed in any way. Wear and tear on the rubber type is not consequential, since with the printing of dates, for example the filling date, type needs to be exchanged each day in any case. For uniform inking, it is also advantageous that the rotating inking ribbon is formed as an endless inking ribbon guided over deflection rollers, whereby the deflection rollers feature a cambered shell. The ink ribbon is centered on the deflection rollers by means of this cambered shell, without any guide rails or the like touching the edges of the ink ribbon. The edges of the inking ribbon are thereby protected, so that the ink applied at the middle of the inking ribbon is not smeared by fringed edges.

It is also advantageous for one of the deflection rollers to be constructed as a spring-supported tension roller, since, as experience has shown, the inking ribbons stretch after some time in operation.

According to a preferred embodiment, the tension roller is supported on a dual-armed rocker onto which a tension spring makes contact. This rocker can dip into the ink sump in the ink container. In this manner the swivel axle of the rocker is continuously lubricated, so that the ability of the tension device to function cannot be impaired by dried ink or other matter.

In another design forthe invention there is a provision that the inking ribbon and the deflection rollers are integrated in the ink container, whereby the inking ribbon can be driven synchronously with respect to the inking roller by means of a detachable coupling in the ink container, so that it transports ink from a low-lying ink sump to the ink roller in interdependence with the labeler capacity. The special feature in this arrangement relates to the ink transfer from the ink container to the inking roller by means of an ink-advancement mechanism, which can be driven by and uncoupled from the machine and is integrated in a compact, cassette shaped container. The arrangement of an integrated inking ribbon, which can be driven synchronously with respect to the inking roller by means of a detachable coupling, results in the fact that the containers can also be exchanged while the machine is running. The employed drive elements which are capable of being coupled have sufficiently large tooth tolerances to be able to fit together without difficulty at rest or during operation. To fasten the container, simple slide-rails are provided with stops and corresponding latches.

The endless inking ribbon is guided over rollers through an ink sump lying in the lower part of the ink container. Any possible excess ink picked-up is wiped off on the way to the inking roller by means of the guide and deflection rollers. One of these deflection rollers is driven by means of a worm drive from the inking roller shaft. The above mentioned spring-loaded tension roller causes sufficiently great pre-stress on the ink ribbon, so that this ribbon touches the inking roller and is taut between the two deflector rollers without additional pressure elements. This assures advantageous ink transfer, since the ribbon spreads over its cylindrical shell vertical to the rotating surface of the ink roller, and a smaller and more compact ink container in the form of a cassette can be used more efficiently.

In a further refinement of the invention it is provided that the ink ribbon, as viewed in its direction of rotation, is brought into contact with a longitudinal guide plate in an area before the point of contact with the inking roller. This longitudinal guide plate prevents the rapid drying of the ink ribbon when at rest. Since the inking ribbon contacts the guide plate over a longitudinal area just short of the contact position and is thereby maintained in a moist condition, this measure permits the immediate initiation of the printing process after the restart of the printing mechanism. The remaining part of the ribbon between the ink sump and the contact position, to the extent that it is not covered by the guide plate, absorbs ink held at the guide plate as it brushes against the guide plate, so that this part of the inking ribbon can also be employed directly for printing, even if the ink were to be somewhat dried there.

Embodiments of the invention will now be described in greater detail in reference to the accompanying drawings.

DESCRIPTION OF THE DRAWINGS

In FIG. 1 the apparatus 1 for printing labels according to the invention is represented in a top view, as it is arranged in a labeling machine.

The partially outlined labeling machine has a drum-shaped support 2, on which numerous conventional glue palettes 3 are supported in a rotatable fashion.

A stationary labeling magazine 4 is additionally arranged on the outer circumference of the support 2.

The directions of movement for the individual components are indicated by the arrows which have been drawn in.

Figure 1:
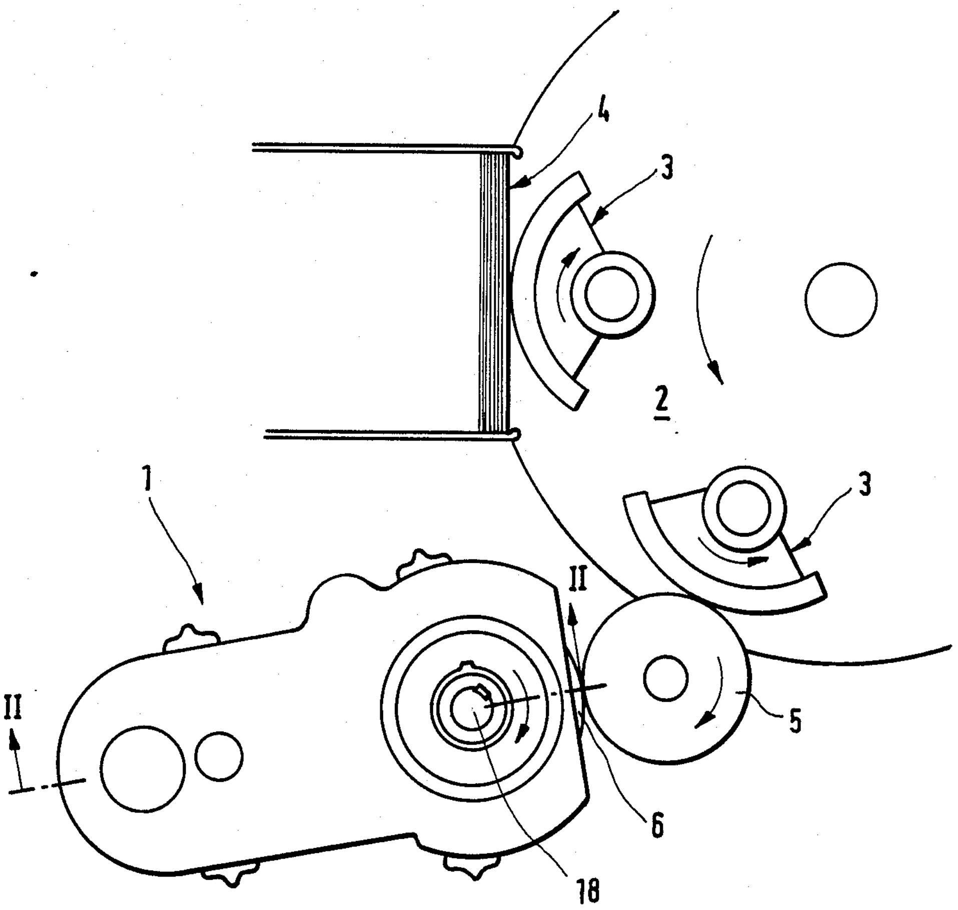
FIG. 1 is a top view of a printer installation, according to the invention, linked with a labeling machine.

As can clearly be seen in FIG. 1, a stamping head 5 is supported in a rotatable fashion behind the labeling magazine 4 in the direction of the support 2 in such a way that it is tangent to the circumference of an orbiting and rotating glue palette 3.

Aside from the labeling magazine 4, the apparatus 1 is arranged such that it is functionally connected with the stamping head 5.

Figure 2:
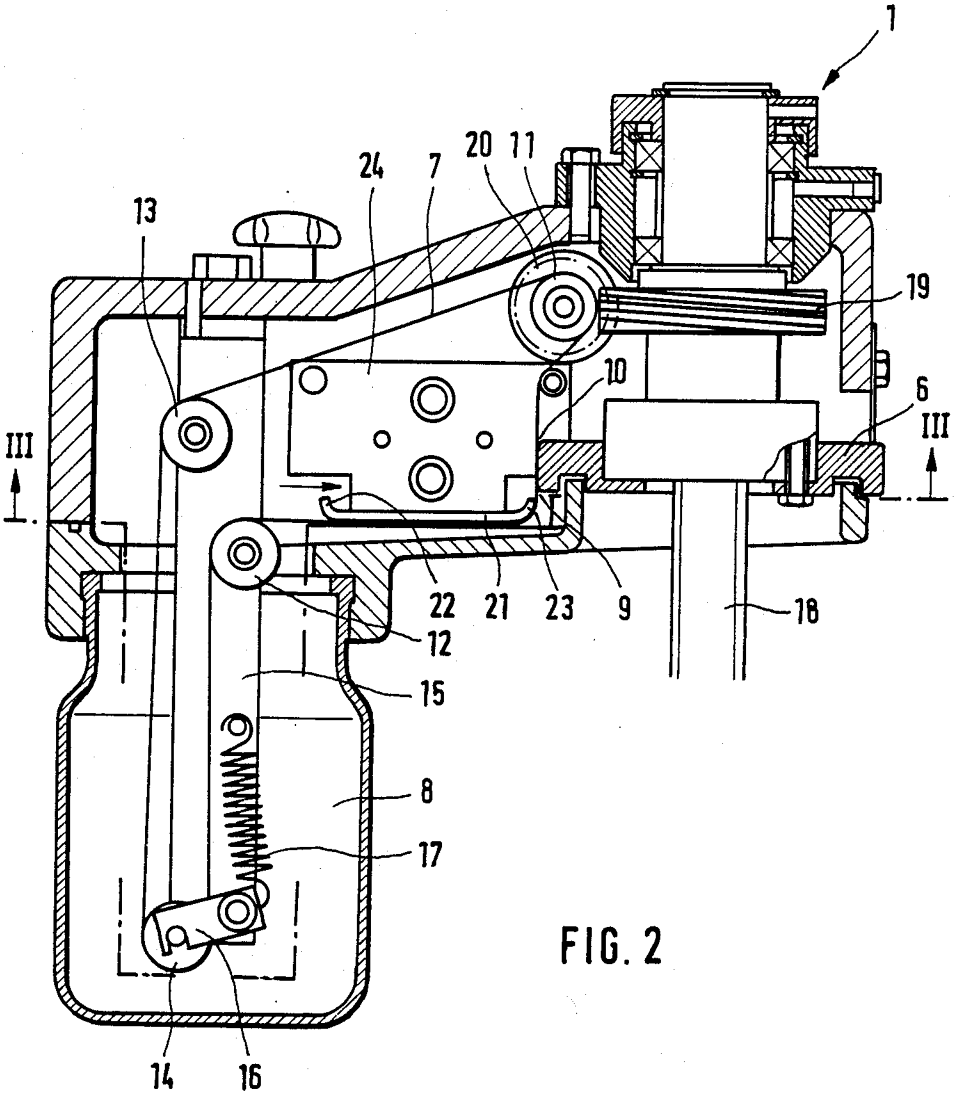
FIG. 2 is a vertical section taken on the line II—II in FIG. 1.
Figure 3:
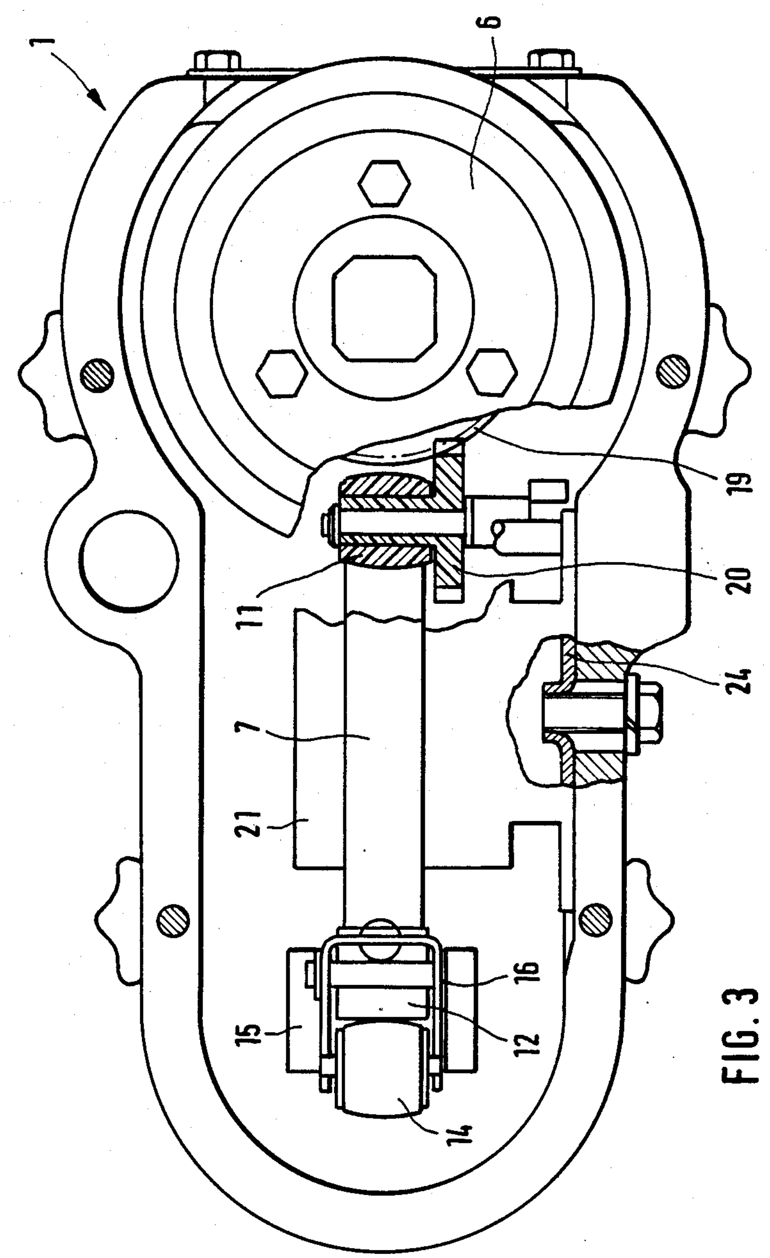
FIG. 3 is a section taken on the line III—III in FIG. 2.

One embodiment of the apparatus according to the invention is represented in FIGS. 2 and 3. The apparatus 1 includes, besides the already mentioned stamping head 5, an inking roller 6 which rotates around a vertical axis as well as a rotating inking ribbon 7 which advances ink from an ink container 8 to the inking roller 6.

It can clearly be seen that the inking ribbon, with regard to its longitudinally extending aspect, is arranged essentially transverse to the direction of rotation in the area of contact between the inking ribbon 7 and the inking roller 6. With the embodied example represented here, the longitudinal extension of the inking ribbon 7 in fact includes a right angle with the rotational direction of the inking roller 6.

It is also clearly recognizable that the inking roller 6 features rounded edges 9 and 10. The inking roller 6 is made of steel, so that the outer circumference of the inking roller 6 that contacts the inking ribbon 7 features a steel surface.

As can specifically be seen in FIG. 2, the rotating ink ribbon 7 is guided over deflection rollers 11, 12, 13 and 14.

As FIG. 3 shows, the deflection rollers feature a cambered periphery which always centers the ink ribbon 7 on the deflection rollers 11 to 14.

The deflection roller 14 extending into the ink container 8 is constructed as a spring-supported tension roller. A dual-armed rocker 16 is attached to a support 15 which extends deeply into the ink container 8, said rocker supporting the tension roller 14. A spring 17 suspended from the support 15 engages the end of the rocker 16 which is directed away from the tension roller 14.

The endless inking ribbon 7 is driven in the direction indicated by the arrow. The drive for the system takes place through a worm gear 19, which is attached to the shaft 18 of the inking roller 6, and onto a worm gear 20, which is attached in a nonrotatable manner to the upper deflection roller 11 as shown in FIG. 3.

As can be seen in FIG. 2, the inking ribbon is guided, as viewed in its direction of rotation indicated by the arrow, over a longitudinal section contacting the guide plate 21 in the region immediately before the point of contact on the ink roller 6. The guide plate 21 has end areas 22 and 23 that are curved upward. The curved end 23 which is associated with the inking roller 6 serves for the deflection of the inking ribbon 7. The guide plate 21 is designed in an angular fashion, for example a steel angle, and is fastened to the side of the inking roller housing by means of the side 24. The guide plate 21 prevents the drying of the inking ribbon 7 when the ribbon is at rest, because the ribbon remains in contact with the guide plate when at rest and therefore cannot dry out. Thereby, an immediate printing procedure can be carried out upon restarting the system after a printing pause.

The stamping head 5 illustrated in FIG. 1 is constructed as a type-wheel with exchangeable rubber type.

In the following, the mode of operation of this first embodiment of the invention is explained.

First of all, an ink container 8 is plugged or screwed into the housing of the apparatus 1 from below. The tension roller 14 attached to the support 15 then dips the inking ribbon 7 into the ink sump in the container 8. If the installation is now placed into operation, then the shaft 18 rotates and drives the inking ribbon 7 by means of worm gear 19 and the worm wheel 20. At the same time, the steel roller 6 is directly driven. In the contact area between the inking ribbon 7 and the inking roller 6 the inking ribbon 7 runs essentially vertically upward, while the circumferential surface of the inking roller 6 moves in a horizontal direction.

The excess ink which is advanced upward by translation of the inking ribbon is then to a great extent wiped off on the deflection roller 12. Nevertheless, a bead of ink develops on the convergent nip between the lower rounded edge 9 of the inking roller 6 and the inking ribbon 7, which provides for a uniform distribution of the ink with respect to the width of the inking ribbon 7.

As a result of the movement of the inking ribbon 7 transversely to the rotational direction of the inking roller 6, the ink is uniformly spread onto the surface of the inking roller 6.

The rubber type on the stamping head 5, which is constructed with a type-wheel, adsorbs the ink from the surface of the steel roller 6 and transports it onto labels found on the glue palette 3.

The material for the ink ribbon 7 can be polyester fabric. A favorable combination of materials results with the steel roller 6, which considerably reduces wear and tear on inking ribbon 7.

Figure 4:
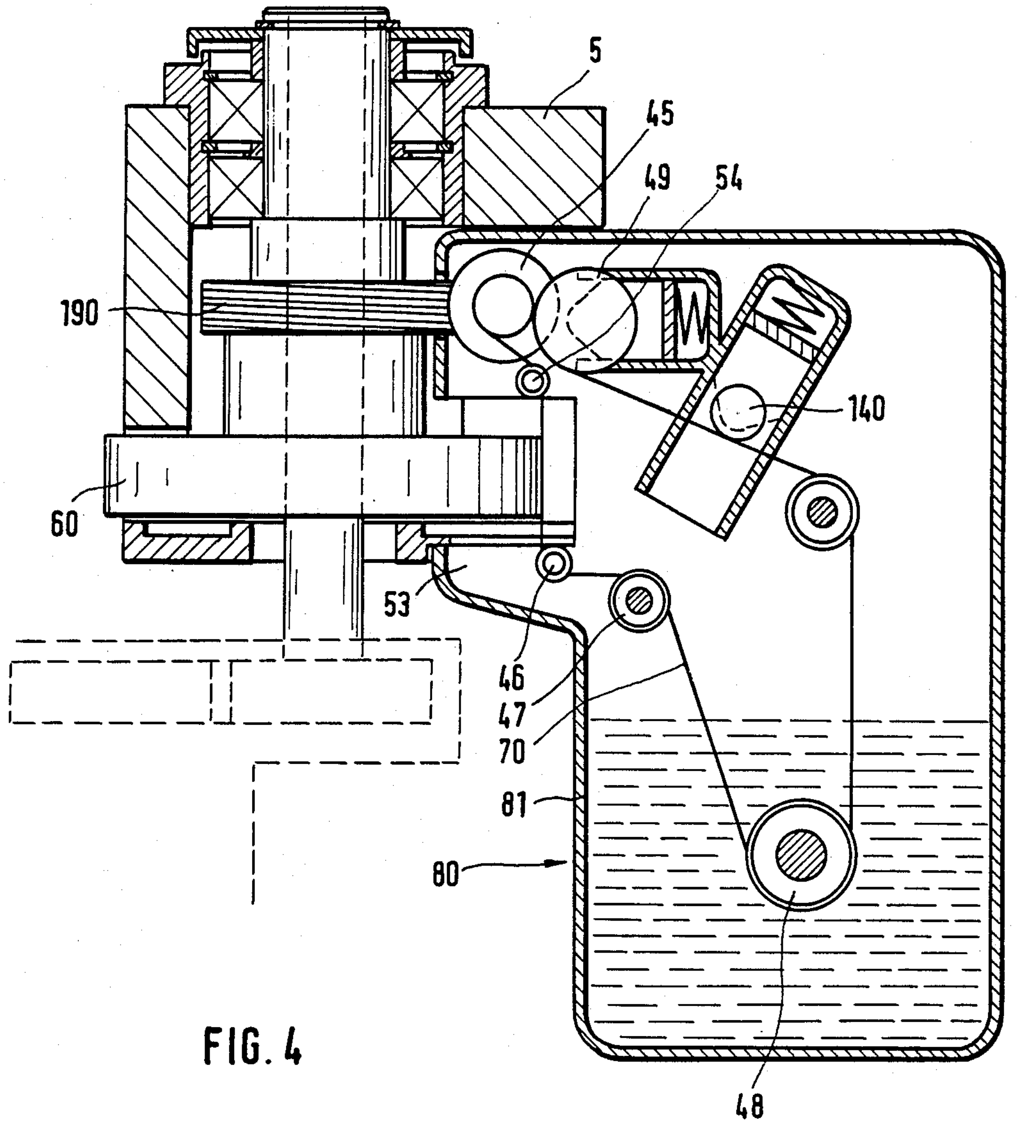
FIG. 4 is a section through an ink roller housing with an ink ribbon cassette according to a further embodiment of the invention.
Figure 5:
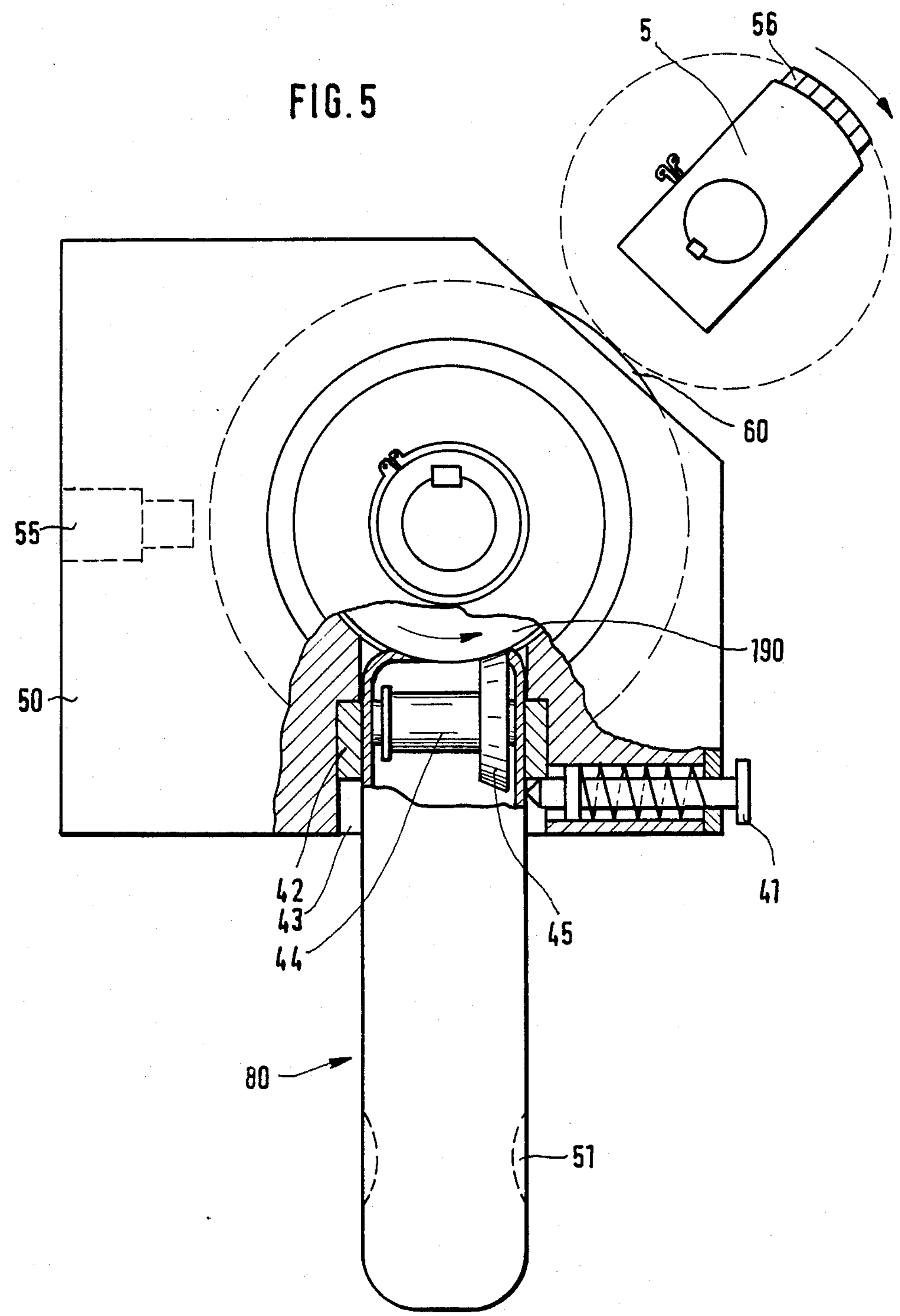
FIG. 5 is a top view with drive and coupling elements of the FIG. 4 embodiment.

In the first embodiment represented here, the entire mechanism for the rotating inking ribbon 7 is in the inking roller housing itself. It is also possible, however, to fasten this mechanism partially in an ink container, such that with each exchange of the ink container, the inking ribbon 7 is also automatically exchanged. The second embodiment represented in the FIGS. 4 and 5 is based on this construction.

With this construction a rotating inking ribbon 70 is integrated in the ink container, said inking ribbon being driven by means of a detachable coupling synchronously with the inking ribbon, so that it transports the ink from the low-lying ink sump onto the ink roller 60 interdependently with the labeling machine 2.

The detachable coupling is thereby activated by means of cofunctioning of the worm gear 190 with the worm wheel 45. All of the deflection rollers required for driving the inking ribbon 70 and for the tension and passage of the inking ribbon on the inking roller 60 are located within the ink container 80, so that the container 80 is exchangeable along with the inking ribbon in the form of a cassette. The ink container housing 81, which is partially composed of plastic, can, for assembly, be introduced laterally into a slot milled vertically into the inking roller housing 50, whereby the most exact positions of the ink container 80 for the drive gear toothing are assured by means of laterally attached stops 42 (see FIG. 5), which slide in groove-shaped guides 43. The ink container 80 is locked in place by means of a spring-loaded safety bolt 41 which lies in the inking roller housing 50. This ink container 80, which consists of plastic, has two horizontal openings on its side which extends into the slot in the inking roller housing 50 for the entry of the inking roller 60 and the worm gear 190, into which the slightly beveled gear wheel 45, which is constructed as one piece with the drive pulley 44, extends. By means of six deflection rollers supported by shafts in the ink container 80, the endless fabric polyester ribbon 70 is guided such that it brushes against this inking roller vertically to the rotational direction of the inking roller 60 from top to bottom. In the area under the inking roller 60, two deflection rollers 46 and 47 are arranged which also serve as ink-wiping rollers and carry out a rolling motion on both sides of the ribbon. The deflection roller 48 lying in the ink sump is supported at some distance with respect to the floor of the ink container, so that dirt particles landing in the ink sump from the ink ribbon can be collected undisturbed on the bottom.

The loop angle on the drive roller 44 chosen for a slip-free drive of the moist ink ribbon 70 is provided by a spring loaded pressure roller 49 adjoining the drive pulley 45. Based on experience, ribbons of this type stretch with increasing operation time, which undesirably decreases the tensile force on the inking roller and in the extreme could interrupt the ink transfer. This effect is counteracted by a likewise spring-loaded tension roller 140. The pressure roller 49 as well as the tension roller 140 are supported in a rotatable fashion in U-shaped curved stirrups. The stirrups themselves also slide in U-shaped guide rails, not shown, which are cast into both sides of the inner side of the ink container 81. Possible drops and splashes of ink in the area of the deflection rollers 46 and 47 and below the inking roller are carried back into the ink sump by means of a catch trough 53 that extends under the ink roller. In the upper part of the ink container outer surfaces, finger grip areas 51 are included for easier handling. With the arrangement as represented in FIGS. 4 and 5, in which the ink container is constructed in the form of a detachable cassette, the exchange of the cassette is possible without any halt in the operation of the system, in a simple manner, for example, when there is a tear in the ribbon or when ink is being replenished.

As is indicated in FIG. 5, a sensor 55, which may utilize high frequency microwaves, can be placed laterally of the ink roller 60 in the ink roller housing 50, said sensor being used to determine the surface moisture on the ink roller 60 and being able to automatically generate a signal to an indicator or to an automatic ink container exchange device. Depending on the type of sensor used, either the personnel are made aware of the situation, or a gripping device, not shown, for cassette exchange is automatically activated.

These individual ink containers 80 can be stored in such a manner that they lie next to each other in a magazine which can be arranged at a suitable height in front of the ink container housing 50 so as to be transversely displaceable.

The mode of operation of the second embodiment according to FIGS. 4 and 5 corresponds to the mode of operation as explained based on the first embodiment.

We claim:

1. Apparatus for printing labels on a labeling machine said apparatus including a printing head, a rotating inking roller, an ink container, and an inking ribbon which translates longitudinally in a takes ink from ink in said container, said linking ribbon contacting the outer circumference of the inking roller, said inking ribbon being arranged to translate generally transversely to the direction of rotation of the inking roller in the area of contact between the inking ribbon and the inking roller.

2. The apparatus according to claim 1 wherein said inking ribbon is arranged at an approximate right angleto the direction of rotation of the inking roller.

3. Apparatus according to any one of claims 1 or 2 wherein the edges of said inking roller which are boundaries of the periphery thereof are rounded.

4. Apparatus according to any one of claims 1 or 2 wherein the inking roller is a steel roller.

5. Apparatus according to any one of claims 1 or 2 wherein the printing head is constructed as a wheel on whose periphery there is rubber type.

6. Apparatus according to any one of claims 1 or 2 including deflection rollers on which said ribbon runs, at least one of the deflection rollers having a cambered periphery.

7. Apparatus according to claim 6 comprising means including spring means for biasing at least one of the deflection rollers against said ribbon to create tension in said ribbon.

8. Apparatus according to claim 7 including a dual-armed rocker lever on which said one deflection roller is mounted for rotation and the biasing force of said spring means is applied to said rocker arm.

9. Apparatus according to claim 1 including a detachable container and deflection rollers on which said ribbon runs, said rollers being mounted to the ink container and a detachable coupling means for driving said ribbon concurrently with the inking roller so said ribbon conveys ink from a low-lying ink sump in the container onto the inking roller in interdependence with the labeling machine operation.

10. Apparatus according to claim 9 wherein said coupling means is constructed and arranged in such a manner that when it is uncoupled said ink container is automatically released and when recoupled said ink container is automatically locked in place.

11. Apparatus according to any one of claims 9 or 10 including a housing for said ink roller, said coupling means comprises two cooperating driven and driving elements of which one is supported in the ink container and the other is supported in the inking roller housing.

12. Apparatus according to claim 11 including slide rails for mounting said container to said housing and latch means for detachably securing the container to the housing.

13. Apparatus according to claim 11 wherein the ink container integrally containing the ink ribbon is constructed as a cassette.

14. Apparatus according to claim 11 including a guide roller supported in the container for driving said ribbon, said guide roller being driven synchronously with the inking roller.

15. Apparatus according to claim 14 wherein the inking roller and the guide roller are connected by means of a worm gear drive and a disengageable worm wheel.

16. Apparatus according to claim 14 wherein two of said deflection rollers are respectively close to and on opposite sides of said inking roller and said inking ribbon touches the inking roller between said two deflection rollers.

17. Apparatus according to claim 11 wherein the inking ribbon translates at a slower speed than the peripheral speed of the inking roller.

18. Apparatus according to claim 1 including a longitudinally extending guide plate and the inking ribbon as, viewed in its direction of translation, is brought into contact with said longitudinally extending guide plate in the direction of translation of the ribbon in a region before the point of contact with the inking roller.

* * * * *

UNITED STATES PATENT AND TRADEMARK OFFICE

CERTIFICATE OF CORRECTION

PATENT NO. : 4,824,514

DATED : April 25, 1989

INVENTOR(S) : Egon Schneider et al.

It is certified that error appears in the above—identified patent and that said Letters Patent is hereby corrected as shown below:

| | |
|---|---|
| Column 6, Line 59 | Before "takes" delete "a" and substitute --- and --- |
| Column 6, Line 60 | Before "ribbon" delete "linking" and substitute --- inking --- |
| Column 6, Line 67/68 | Delete "angleto" and substitute --- angle to --- |

Signed and Sealed this

Twenty-third Day of January, 1990

*Attest:*

JEFFREY M. SAMUELS

*Attesting Officer*

*Acting Commissioner of Patents and Trademarks*